United States Patent
Boudreaux (10) Patent No.: US 8,489,901 B2
(45) Date of Patent: Jul. 16, 2013

(54) METHODS AND SYSTEMS FOR SECURE ENCRYPTION OF DATA

(75) Inventor: John Boudreaux, Boca Raton, FL (US)

(73) Assignee: Sonavation, Inc., Palm Beach Gardens, FL (US)

( * ) Notice: Subject to any disclaimer, the term of this patent is extended or adjusted under 35 U.S.C. 154(b) by 742 days.

(21) Appl. No.: 12/115,390

(22) Filed: May 5, 2008

(65) Prior Publication Data

US 2009/0327762 A1    Dec. 31, 2009

(51) Int. Cl.
*G06F 11/30* (2006.01)
(52) U.S. Cl.
USPC ............... 713/194; 380/44; 380/45; 380/46; 380/277; 326/8; 326/37; 713/189
(58) Field of Classification Search
USPC ... 713/194, 189; 380/44–46, 277, 259; 326/8, 326/37
See application file for complete search history.

(56) References Cited

U.S. PATENT DOCUMENTS

| | | | | |
|---|---|---|---|---|
| 5,097,505 | A * | 3/1992 | Weiss | 380/270 |
| 6,577,734 | B1 * | 6/2003 | Etzel et al. | 380/277 |
| 7,336,095 | B2 * | 2/2008 | Erickson et al. | 326/8 |
| 2005/0180572 | A1 * | 8/2005 | Graunke | 380/277 |
| 2006/0133605 | A1 * | 6/2006 | Funahashi et al. | 380/30 |
| 2006/0208066 | A1 * | 9/2006 | Finn et al. | 235/380 |

OTHER PUBLICATIONS

System support for robust data collection in wireless sensing systems Zhan, Guoxing. ProQuest Dissertations and Theses;2012. vol. 0984,Iss.0254;p.n/a Source: ProQuest Dissertations and Theses.*
Identity-based cryptographic security using a cross-layer design approach in wireless sensor networks Kupwade Patil, Harsh. ProQuest Dissertations and Theses;2012. vol. 0984,Iss.0210;p. n/a Source: ProQuest Dissertations and Theses.*
Resource-Aware Data Fusion Algorithms for Wireless Sensor Networks Abdelgawad, Ahmed Mohamed. ProQuest Dissertations and Theses;2011. vol. 0464,Iss.1363;p.n/a Source: ProQuest Dissertations and Theses.*
System support for robust data collection in wireless sensing systems Zhan, Guoxing. Wayne State University, ProQuest, UMI Dissertations Publishing, 2012.*
Identity-based cryptographic security using a cross-layer design approach in wireless sensor networks Kupwade Patil, Harsh. ProQuest Dissertations and Theses;2012. vol. 0984,Iss.0210;p.n/a Source: ProQuest Dissertations and Theses.*

* cited by examiner

*Primary Examiner* — Thanhnga B Truong
*Assistant Examiner* — Angela Holmes
(74) *Attorney, Agent, or Firm* — Kenneth J. Lukacher Law Group (57) ABSTRACT

Provided is a data acquisition module. The data acquisition module includes a memory and a controller. The controller includes an encryption module configured to encrypt information written to the memory using a key included in the controller. The key is unique to the controller.
Also provided is a method for processing identification information. The method includes encrypting information with a key included in a controller and storing the encrypted information. The key is unique to the controller.

20 Claims, 5 Drawing Sheets

METHODS AND SYSTEMS FOR SECURE ENCRYPTION OF DATA

BACKGROUND OF THE INVENTION

1. Field of the Invention

The present invention relates to the encryption of identification information.

2. Related Art

Identification systems can be used to sense identification characteristics of an individual or object (e.g., a fingerprint) and determine the identity of the individual. The determined identity can then be mapped to a set of privileges. In such a manner, identification characteristics can be used as the basis from which privileges are granted. For example, a person's fingerprint can be used to determine whether the person is allowed to open a door, use a credit card, access the contents of a memory, etc.

Although such systems can restrict privileges based on legitimate attempts by an individual, some individuals may attempt to obtain privileges illegitimately. By tampering with the identification system, candidates may be able to deceive the identification system into determining an incorrect identity for an individual. For example, the identification system may be deceived into determining the identity of an individual to be an individual that has certain privileges when, in fact, the actual individual does not have those privileges. For example, an individual may provide a fake fingerprint to gain access a computer.

What are needed, therefore, are methods and systems that prevent individuals from being able to tamper with identification and authorization systems in order to illegitimately obtain privileges.

SUMMARY OF THE INVENTION

The present invention relates to systems and methods for encrypting information. In an embodiment, a data acquisition module includes a memory and a controller. The controller includes an encryption module configured to encrypt information written to the memory using a key included in the controller. The key is unique to the controller.

In another embodiment, a method for processing identification information includes encrypting information with a key included in a controller and storing the encrypted information. The key is unique to the controller.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
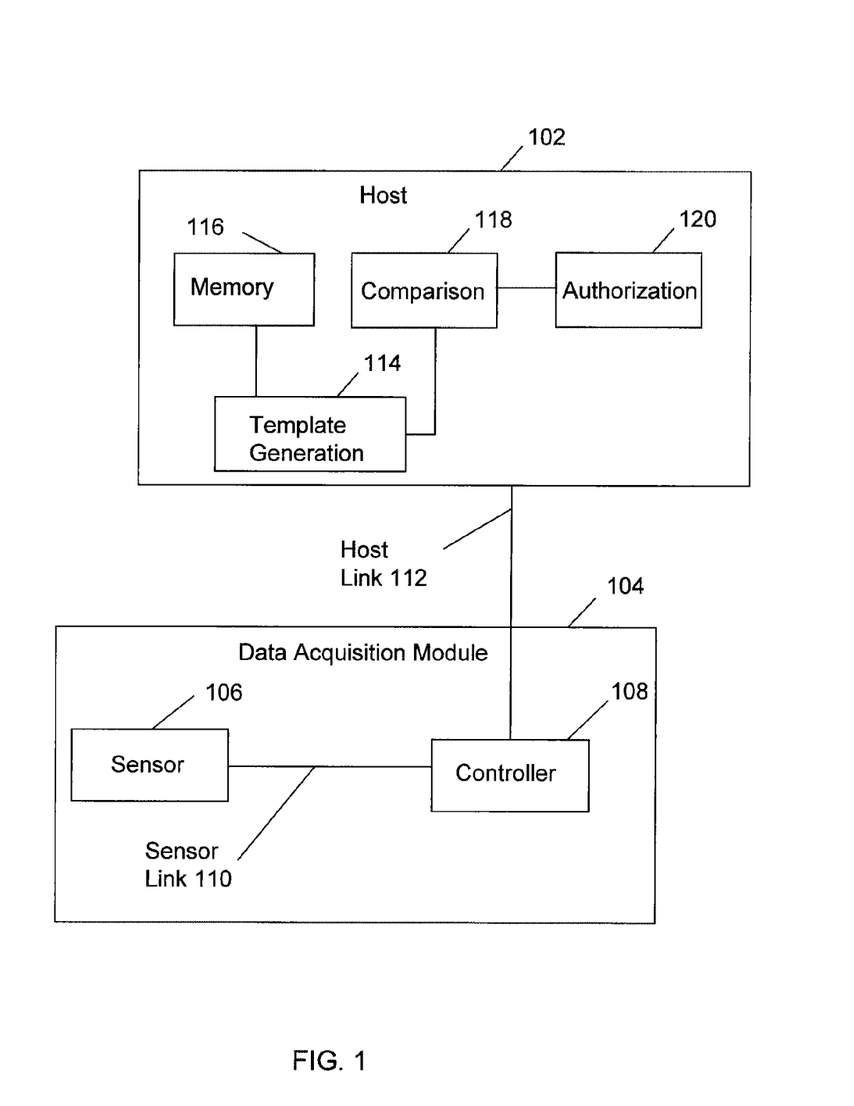
FIGS. 1-2 are block diagram illustrations of identification and authorization systems, according to embodiments of the present invention.

FIG. 1 shows an identification and authorizing system 100, according to an embodiment of the present invention. System 100 includes a host 102 and a data acquisition module 104. In an embodiment, system 100 may be used to determine the identity of a candidate (e.g., a person, key, etc.) and to determine whether to grant privileges to the candidate. For example, system 100 can provide access to a private or privileged device to selected individuals. By comparing a template generated from sensed data to a stored template associated with a known individual, system 100 can determine the identity of the candidate as being the known individual and provide access according to the privileges associated with that individual. Alternatively, if the generated template does not match the stored template, access can be restricted.

Data acquisition device 104 includes a sensor 106 and a controller 108. Sensor 106 is configured to sense identification characteristics (e.g., a fingerprint, bar code, a retina, etc.) from a candidate and output sensed data. For example, sensor 106 can be a fingerprint sensor that outputs sensed fingerprint data. Sensor 106 can be a swipe fingerprint sensor that outputs multiple partial images (i.e., image slices) corresponding to a swiped finger. In alternate embodiments, sensor 106 can be other types of sensors (e.g., retinal sensor, bar code scanner, etc.). The sensed data is transmitted to controller 108 over a sensor link 110.

Controller 108 transmits the sensed data to host 102. Host 102 includes a template generation module 114, a memory 116, a comparison module 118, and an authorization module 120. Template generation module 114 is configured to generate a template based on sensed data received from data acquisition device 104. For example, template generation module 114 may be configured to receive image slices of a fingerprint and generate a fingerprint template by aligning the image slices. Template generation module 114 can align image slices according a variety of techniques. For example, template generation module 114 can align image slices according to a PHAse Transform technique. For more information regarding a PHAse Transform technique, please see U.S. Non-Provisional application Ser. No. 12/007,344 entitled "Method and System for Swipe Sensor Image Alignment Using Fourier Phase Analysis," filed Jan. 9, 2008, which is incorporated herein by reference in its entirety.

In a further embodiment, template generation module 114 can generate templates in two modes. In the first mode, host 102 and/or data acquisition module 104 knows the identity of the candidate. The template generated by template generation module in this mode is stored in memory 116. In the second mode, host 102 and/or data acquisition module 104 does not know the identity of the candidate. The template generated in this mode is transmitted to comparison module 118 which compares that generated template to templates stored in memory 116 associated with known individuals or objects (i.e., templates generated in the first mode) to determine the identity of the candidate.

Memory 116 is configured to hold information pertinent to the identification and authorization operations. For example, memory 116 can store instructions that template generation module 114, comparison module 118, and/or authorization module 120 execute to perform their respective functions.

Comparison module 118 is configured to receive a generated template compare it to one or more stored templates associated with known individuals or objects to determine a possible match. For example, comparison module 118 may compare a fingerprint template generated by template generation module 114 to one or more stored fingerprint templates. In such an embodiment, a matching score is computed between the generated fingerprint template and one or more stored fingerprint templates, e.g., the matching score ranging from 0 to 100, with 0 being no similarity and 100 being a perfect match. If a computed matching score is above a certain threshold, the identity of the candidate is determined to be the individual associated with the stored fingerprint template with which the generated template was compared. Alternatively, if none of the computed matching scores is above the threshold, the identity of candidate is unknown. As would be appreciated by those skilled in the relevant art(s) based on the description herein, in embodiments in which sensor 106 senses other types of identification characteristics (e.g., a bar code, retina, etc.), an identity can be similarly determined.

Authorization module 120 is configured to determine which, if any, privileges should be granted to the candidate. For example, authorization module 120 can map the determined identity of the candidate provided by comparison module 118 to privileges using a lookup table. In a further embodiment, authorization module 120 can be configured to not grant any privileges to a candidate whose identity is unknown. As would be appreciated by those skilled in the relevant art(s) based on the description herein, template generation module 114, comparison module 118, and authorization module 120 can be implemented as hardware, software, firmware, or any combination thereof.

Although system 100 can selectively provide privileges to candidates based on their determined identity, portions of system 100 can be altered or bypassed so that privileges are illegitimately obtained. For example, the contents of memory 116 can be copied or changed. By copying contents of memory 116, a false object (e.g., fingerprint or key) can be generated based on a copied template. Thus, a candidate can use the false object to illegitimately gain privileges. Moreover, altering the contents of memory 116 may allow an individual to change a stored template so that a generated template matches the stored template and privileges are obtained. Additionally or alternatively, information can also be obtained and/or changed when it is transmitted between when it is transmitted between host 102 and data acquisition module 104.

Figure 2:
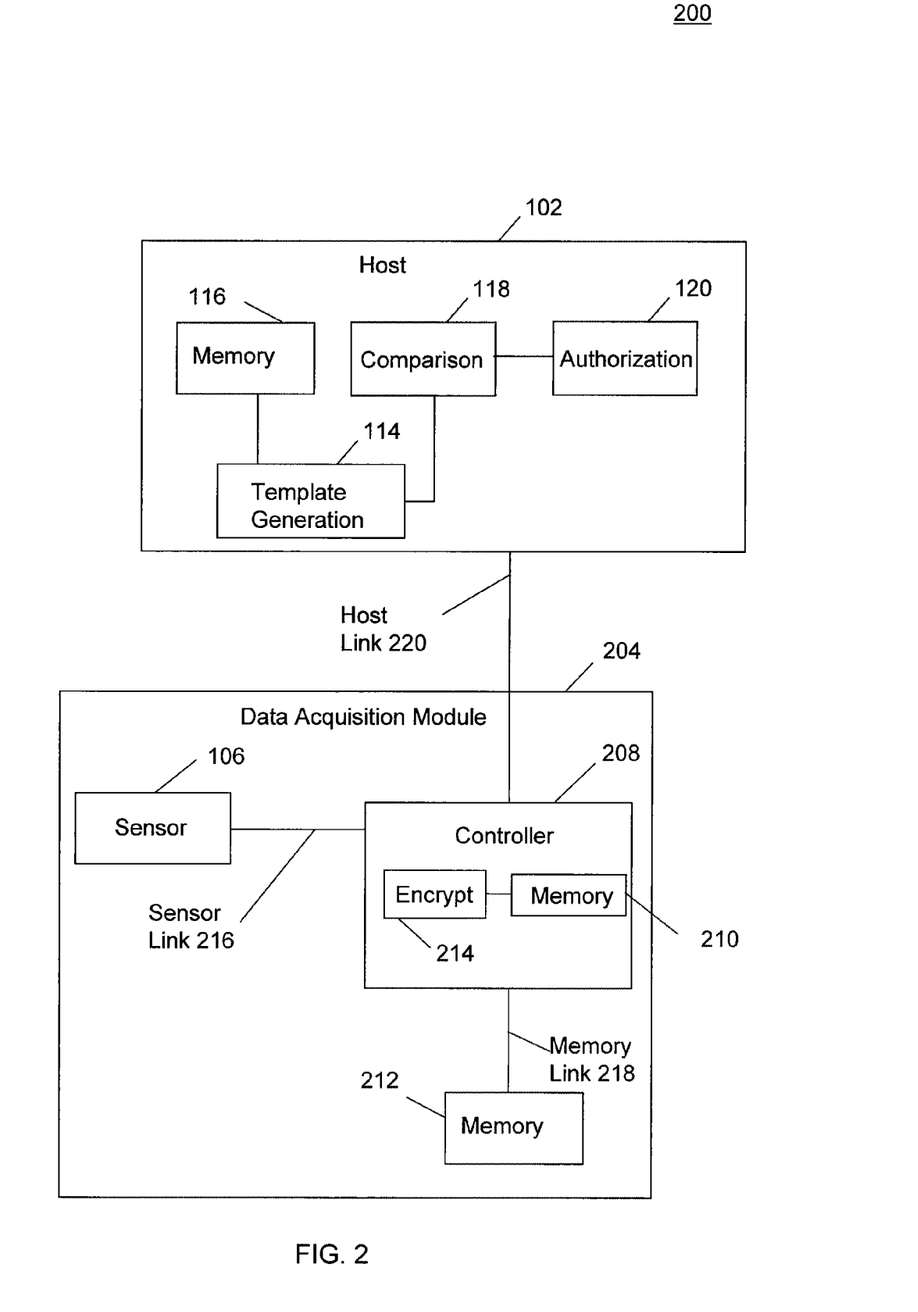

FIG. 2 shows an identification authorizing system 200, according to an embodiment of the present invention. System 200 includes host 102 and a data acquisition module 204. Host 102 is generally similar to host 102 described with reference to system 100 shown in FIG. 1, unless described otherwise below.

Data acquisition module 204 includes sensor 106, a controller 208, and a memory 212. Similar to sensor 106 shown in FIG. 1, sensor 106 shown in FIG. 2 senses identification characteristics of a candidate (e.g., a fingerprint) and outputs sensed data (e.g., image slices) to controller 208 over a sensor link 216. Controller 208 transmits the sensed data to host 102 over a host link 220. As described above, template generation module 114 generates a template based on the received sensed data.

However, in contrast to system 100 shown in FIG. 1, memory 116 does not store templates of known individuals or objects. Instead, these templates are stored in memory 212 of data acquisition module 204. In such a manner, host 102 is not required to store information (e.g., sensed data, templates, etc.) associated with the identification of the candidate individual or object. Freeing host 102 from this requirement can prevent an individual from illegitimately gaining privileges by copying or altering the contents of memory 116.

Memory 212 can be persistent memory (e.g., a FLASH memory). In an embodiment, memory 212 is formed on a die separate from a die on which controller 208 is formed. Furthermore, as shown in FIG. 2, memory 212 is located within data acquisition module 204. Being located within data acquisition module 204 can provide physical security for memory 212 through the packaging of data acquisition module 204. In alternate embodiments, memory 212 may be located outside of data acquisition module 204.

To prevent an individual from tampering (e.g., copying or altering) with the contents of memory 212, the contents are signed. For example, a cryptographic checksum or cyclical redundancy check (CRC) value, or other technique as would be known to those skilled in the relevant art(s) based on the description herein, can be used. Furthermore, the contents of memory 212 are also encrypted. In an embodiment, the contents of memory 212 are encrypted by an encryption module 214 according to a symmetrical encryption technique such as the Data Encryption Standard (DES), the Triple DES, the Advanced Encryption Standard, or other technique as would be known to those skilled in the art.

Encryption module 214 encrypts information using a unique and inaccessible key included in controller 208. For example, as shown in FIG. 2, encryption module 214 is coupled to a memory 210. In an embodiment, memory 210 is a persistent and non-volatile memory. In a further embodiment, memory 210 is a one-time programmable memory (OTP) that stores the key. The key can be 256 bits, 512 bits, or other lengths. In a further embodiment, the size of the memory is equal to the size of the key or greater.

The key included in controller 208 is unique to controller 208. Controllers that are one of multiple substantially identical controllers in a series or line of controllers often have little or no uniqueness. However, the key included in controller 208 is unique to the individual controller making it unique compared to other controllers in that series or line of controllers. In a further embodiment, each controller in such a series or line includes a unique key. Thus, if an individual discovers a way to determine a key of one of the controllers in the line of the controllers, that key can only be used to decrypt information on the controller breached by the individual and not others controllers in that line or series of controllers.

Furthermore, the key included in controller 208 can also be also inaccessible. For example, such a key that can be cryptographically random and not recorded. A cryptographically random key is a key that cannot be determined based a characteristic (e.g., a serial number) of controller 208. The key is also not recorded at any point during the design, manufacture, or use of controller 208. In an embodiment, a cryptographically and unrecorded key prevents an individual from obtaining the key from a source with knowledge regarding controller 208 and/or deriving the key from the characteristics of controller 208. In a further embodiment, such a key can force an individual to try every possible key to determine a matching key. As would be understood by those skilled in the relevant art(s) based on the description herein, a key with 256 or 512 bits would take substantial computational power to obtain in a reasonable amount of time by trying every possibility.

Furthermore, the key included in controller 208 can result from a manufacturing step used to form controller 208. For example, in the embodiment in which the key is stored in memory 210, memory 210 may be permanently programmed during a manufacturing process of controller 208. Memory 210 can be implemented on the same die as controller 208. In the embodiment in which memory 210 is an OTP memory, programming the key in memory 210 may include applying a programming voltage to rupture or "blow" a fuse element of memory 210, thereby altering the logic state of the memory cell.

In a further embodiment, storing the key in memory 210 can also include partially blowing a fuse element of memory 210 instead of completely blowing the fuse element. In such a manner, the fuse element may retain some charge. Thereafter, if portions of controller 204 and/or memory 210 are breached or peeled and/or scanned with X-ray radiation (or other high frequency electromagnetic radiation) in an attempt to gain access to memory 210, the retained charge may be lost, destroying the stored key. Programming memory 210 in such a manner may enhance the inaccessibility of the key. Furthermore, the manufacturing element that blows the fuses of memory 210 may be configured such the configuration of the blown fuses in memory 210 (i.e., the key) is never recorded.

Furthermore, controller 204 and/or memory 210 may also be shielded (e.g., with a material that sufficiently blocks electromagnetic radiation, such as lead), to further prevent the stored key from being scanned.

In an alternate embodiment, the key included in controller 208 can be derived from properties of the die on which controller 208 is formed. As would be appreciated by those skilled in the relevant art(s) based on the description herein, dies used to make integrated circuits (ICs) have a certain amount of inherent uncertainty associated with them due to the process in which they are formed. This uncertainty can remain constant over the life of the die. Furthermore, since the uncertainty depends on the formation of the dies and each die is formed at least slightly differently, the uncertainty is unique to the die. This unique uncertainty is used to generate a random number to be used as the key. Specifics on this approach are readily understood by those skilled in the art.

Thus, in such an embodiment, memory 210 may be replaced with circuitry (not shown) used to extract a random, but constant, number from the uncertainty associated with the die that controller 208 is formed on. Since the circuitry used to extract the key is formed in controller 208, such a key is also included in controller 208 as a result of a manufacturing step used to form controller 208.

Based on the key included in controller 208, encryption module 214 encrypts the contents of memory 212. Encryption module 214 can be implemented as software, hardware, firmware, or any combination thereof. For example, encryption module 214 may be implemented as a hardware module that executes instructions stored in a memory of controller 208. Encryption module 214 can also be configured to decrypt information received from memory 212 using the key included in controller 208.

In an embodiment, encryption module 214 encrypts all information that is to be written to memory 212 before it is transmitted over a memory link 218. Encryption module 214 also can decrypt all information read from memory 212 over memory link 218.

Furthermore, the programs executed by controller 208 (e.g., to process the sensed data output by sensor 106) may also be stored in memory 212 and encrypted by encryption module 214 using the key included in controller 208. Furthermore, as described above, the contents of memory 212 can also be signed so as to prevent an individual from altering its contents.

During an initial phase of operation (e.g., start-up), controller 208 executes instructions to retrieve instructions needed for normal operation from memory. The retrieved instructions are decrypted by encryption module 214 using the key included in memory 208. Thereafter, controller executes instructions that are retrieved from memory 212 and decrypted by encryption module 214.

Thus, even if an individual was able to breach the package of data acquisition module 204 and/or memory 212, and read the contents of memory 212 and/or information communicated over memory link 218, the information read would not be meaningful. Only with the key included in controller 208 could such an individual extract meaningful content from the read information.

Encryption module 214 also encrypts and decrypts communications between data acquisition device 204 and host 102 over host link 220. As described above, the key included in controller 208 is not known outside of controller 208. Thus, encryption module 214 does not encrypt and decrypt communications between data acquisition device 204 and host 102 using that key. Instead, memory 212 stores a host key, encrypted by encryption module 214, from which a session key is generated. The host key is transmitted to host 102 during an initial installation of system 200.

A session key can be generated according to the Secure Hash Algorithm (SHA). In such an algorithm, the host key is used as an input to a function (i.e., a hash function) n number of times. The hash function maps the input value (i.e., the host key) to a predictable output. Thus, after both host 102 and data acquisition device 204 have the host key, a session key can be generated by inputting the host key into the hash function n number of times. Furthermore, a new session key can be generated for each session by choosing another value for n. The generated session key is then used by encryption module 214 to encrypt information transmitted to and decrypt information received from host 102.

In an alternate embodiment, a session key can be generated, for example, according to the Diffie-Hellman (D-H) key exchange protocol. In such a protocol, the host key stored in memory 212 may not have to be transmitted to host 102 during the initial installation, but rather used as a private key. For more information on the Diffie-Hellman key exchange protocol, refer to U.S. Pat. No. 4,200,770 to Hellman et al., which is incorporated herein in its entirety.

In responding to a request for information stored in memory 212 from host 102, controller 208 requests the information from memory 212. The requested information is decrypted by encryption module 214 using the key included in controller 208. Encryption module 214 then encrypts the information using a generated session key. Similarly, when information that is to be written to memory 212 is received by controller 208, it is decrypted by encryption module 214 using the session key and encrypted using the key included in controller 208 before being written to memory 212.

Figure 3:
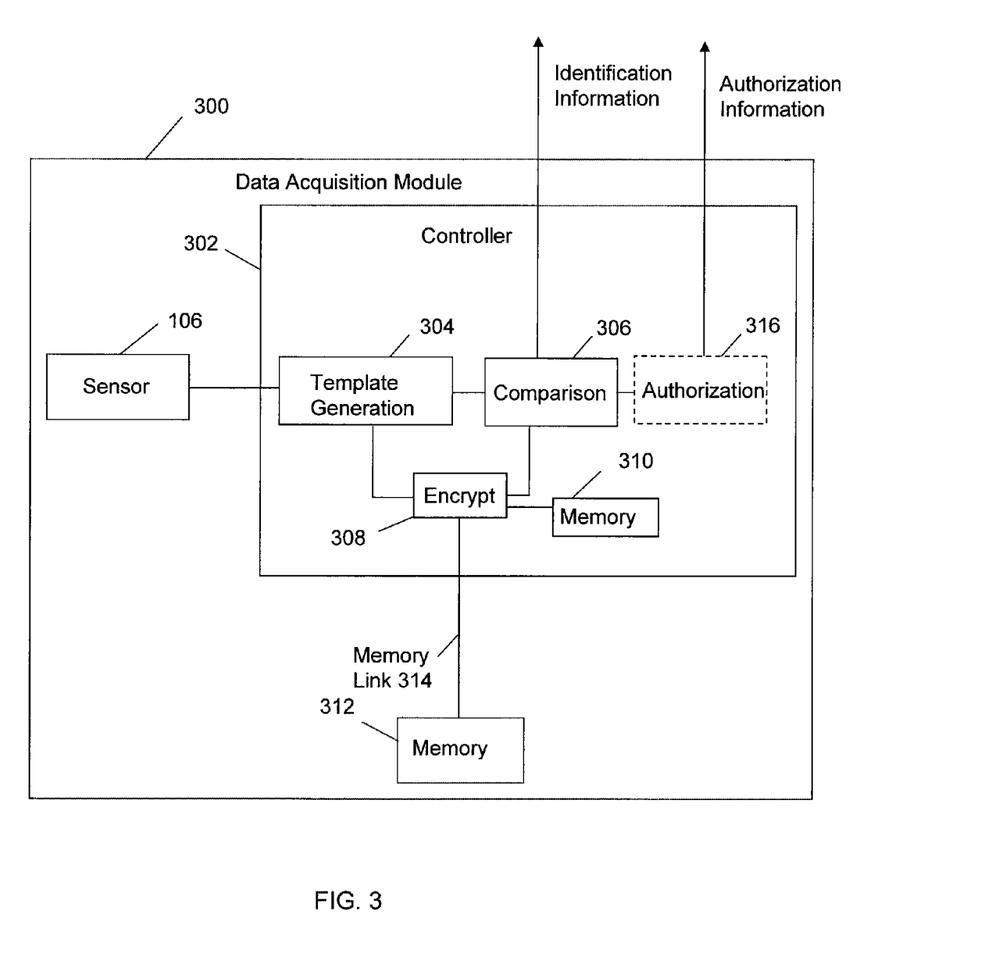
FIG. 3 is a block diagram illustration of a data acquisition module, according to an embodiment of the present invention.

FIG. 3 shows an exemplary data acquisition module 300, according to an embodiment of the present invention. Data acquisition module 300 includes a controller 302, a memory 312, and sensor 106. Controller 302 includes a template generation module 304, a comparison module 306, an encryption module 308, and a memory 310. Memory 310 can be implemented on the same die as controller 302. Template generation module 304, comparison module 306, and encryption module 308 may be implemented as hardware, software, firmware, or any combination thereof.

Similar to controller 208 described with reference to FIG. 2, controller 302 also includes a key. The key can be unique to controller 302 and inaccessible. The key can be stored in memory 310 during manufacturing process of controller 302, as described above with reference to controller 208. In an embodiment, memory 310 is generally similar to memory 210, described with reference to FIG. 2.

Alternatively, the key can be derived from characteristics of the die used to form controller 302. As described above, memory 310 can then be replaced with circuitry needed to derive the key from the characteristics of the die used to form controller 302.

As noted with respect to FIG. 1, sensor 106 of data acquisition module 300 senses identification information (e.g., a fingerprint) and outputs sensed data (e.g., image slices of the fingerprint). Template generation module 304 is generally similar to template generation module 114 described with reference to FIG. 1. Templates generated by template generation module 304 are received by comparison module 306 and encryption module 308. Comparison module 306 and encryption module 308 are generally similar to comparison module 118 and encryption module 214, respectively, described with reference to FIGS. 1 and 2, respectively. When a generated template is to be stored in memory 312, it is first received by encryption module 308. Encryption module 308 encrypts the generated template and transmits the encrypted generated template to memory 312. Memory 312 is generally similar to memory 212 described with reference to FIG. 2.

In a further embodiment, all communications to be sent to memory 312 are first received by encryption module 308. In such a manner, all communications between controller 302 and memory 312 are encrypted so that information gleaned by suitable monitoring of a memory link 314 and/or peeling or otherwise opening memory 312 is encrypted and of little or no use without the key included in controller 302.

Furthermore, all communications received from memory 312 are received by encryption module 308. Encryption module 308 decrypts the received information and transmits the received information to the desired modules of controller 302. For example, comparison module 306 compares templates generated by template generation module 304 to template(s) stored in memory 312. In order to receive the template(s) stored in memory 312, the retrieved template(s) are first decrypted by encryption module 308. Encryption module 308 then transmits the decrypted template(s) to comparison module 306.

Based on the results of a comparison between the retrieved decrypted template(s) and the template generated based on the candidate, comparison module 306 outputs identification information. The identification information may indicate that the candidate is one of a set of known individuals or objects or may indicate the identity of the candidate is unknown.

As shown in FIG. 3, data acquisition module 300 does not require a host to compare templates to determine an identity of a candidate. In such an embodiment, stored or generated templates do not leave data acquisition module 300 and are encrypted with the key included in controller 302. In an embodiment, ensuring that template(s) are not transmitted by data acquisition module 300 to an outside device (e.g., host 102) may provide greater physical security through the enclosure used to form data acquisition module 300 and/or controller 302 and may provide stronger encryption because such data is encrypted with the unique and inaccessible key included in controller 302. In an embodiment, data acquisition module 300 is implemented on a device that requires identification (e.g., a credit card).

Controller 302 also optionally includes an authorization module 316. Authorization module 316 can be generally similar to authorization module 120, described with reference to FIG. 1. Authorization module 316 can determine which, if any, privileges are to be granted to a candidate based on an identity determined by comparison module 306. Thus, controller 302 may output the determined identity of the candidate from comparison module 306 and/or privileges to be granted to the candidate from authorization module 316.

A lookup table accessed by authorization module 316 to determine which privileges are to be granted can be stored in memory 312, and thus can be encrypted using the key included in controller 302. In mapping a determined identity to privileges, portions of the entire lookup table, or portions thereof, are first decrypted by encryption module 308 and then used by authorization module 316.

Identification and authorization information output by controller 302 can be encrypted using a session key generated based on a host key stored in memory 312 according to the Diffie-Hellman or SHA techniques, as described above.

In another embodiment, data acquisition module 300 may be coupled to a host (not shown) that includes an authorization module. Such an authorization module can determine which, if any, privileges should be granted based the identification information provided by comparison module 306 and a lookup table stored in memory 312 or stored in the host.

Figure 4:
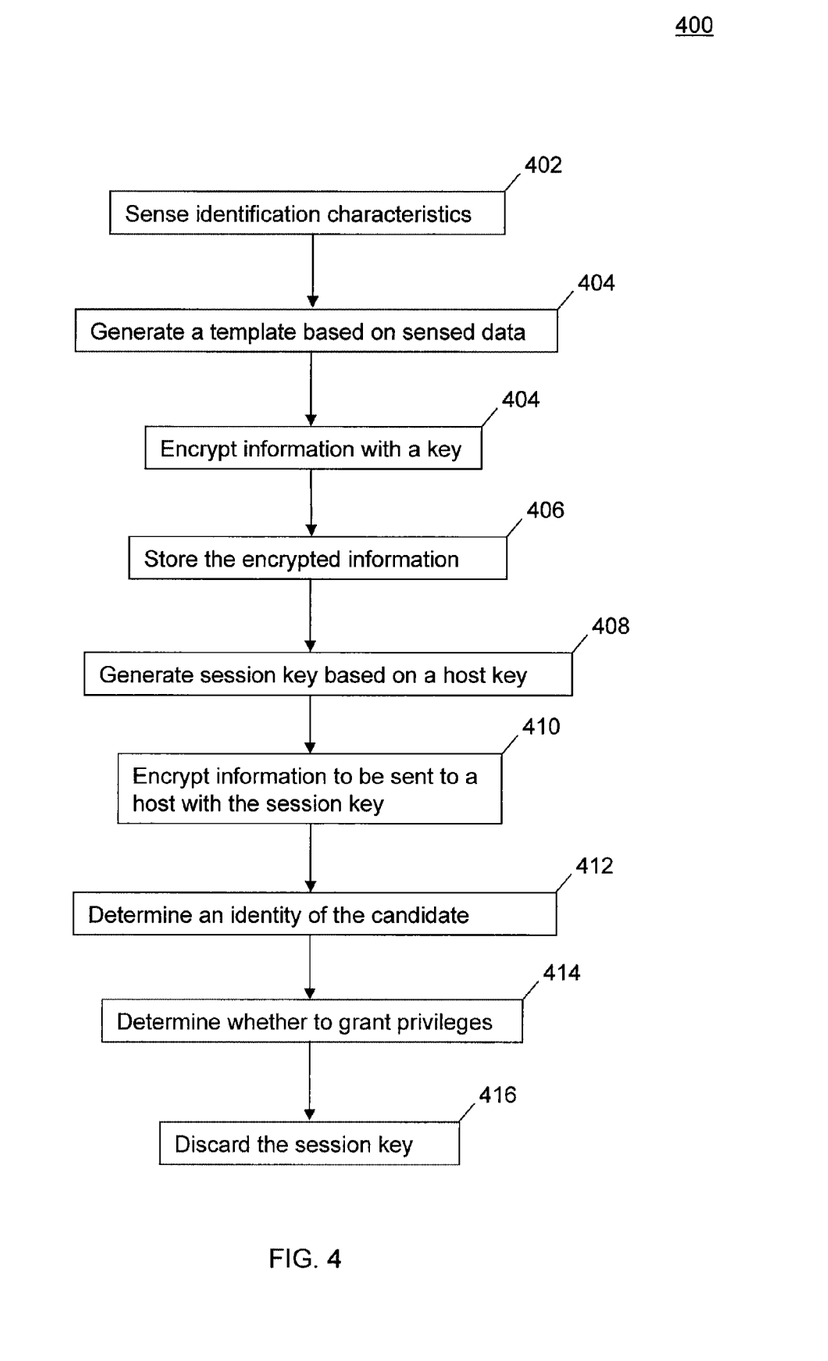
FIG. 4 is a flowchart of a method for processing identification information, according to embodiments of the present invention.

FIG. 4 shows a flowchart 400 of a method for processing identification information, according to an embodiment of the present invention. Flowchart 400 is described with reference to the embodiments of FIGS. 2 and 3. However flowchart 400 is not limited to those embodiments. The steps shown in FIG. 4 do not necessarily have to occur in the order shown. The steps of FIG. 4 are described in detail below.

Flowchart 400 begins with step 402. In step 402, identification characteristics are sensed and sensed data is output. For example, in FIG. 2, sensor 106 senses an identification characteristic (e.g., a fingerprint) of a candidate and outputs sensed data.

In step 404, a template is generated based on the sensed data. For example, in FIG. 2, template generation module 114 of host 102 generates a template based on sensed data received from data acquisition module 204. Alternatively, in FIG. 3, template generation module 304 of controller 302 generates a template based on sensed data received from sensor 106.

In step 406, information is encrypted with a key. For example, in FIG. 2, in the embodiment in which the template is generated based on sensed data obtained from a known individual or object, the template may need to be stored in memory 212. To ensure that the template is not meaningfully copied, it is encrypted by encryption module 214 using the key included in controller 208. Alternatively, the encrypted information may also include other types of information. For example, encryption module 214 may also encrypt a host key that will be stored in memory 212 and used to generate a session key.

In step 408, a session key is generated based on the host key. For example, in FIG. 2, in order to transmit encrypted information to host 102, controller 208 may need to generate a session key based on a host key stored in memory 212 based on the Diffie-Hellman technique or the Secure Hash Algorithm, as described above In step 410, information to be sent to a host is encrypted using the generated session key. For example, in FIG. 2, sensed data and/or templates associated with known individuals or objects to be transmitted to host 102 are encrypted by encryption module 214 based on the generated session key.

As would be apparent to those skilled in the relevant art(s) based on the description herein, the generation of a session key may be unnecessary in the embodiment of FIG. 3. Since sensed identification information and generated templates are not transmitted from data acquisition unit 300, all information on data acquisition module 300 can be encrypted using the key included in controller 302. Alternatively, a session key may be generated to communicate an identity determined by comparison module 306 and/or privileges for a candidate determined by authorization module 316.

In step 412, an identity of a candidate object or individual is determined. For example, in FIG. 2, comparison module 118 receives a template generated by template generation module 114 and template(s) corresponding to known individual(s) to determine the identity of the candidate object. Comparison module 118 can determine the identity of the candidate to be one of the known individuals or object or to be unknown. Alternatively, in FIG. 3, comparison module 306 of controller 302 can determine the identity of a candidate object based on a generated template received from template generation module 304 and template(s) corresponding to known individuals or objects retrieved from memory 312 and decrypted by encryption module 308.

In step 414, it is determined whether to grant privileges to a candidate object. For example, in FIG. 2, authorization module 120 can use a lookup table to map the determined identity to privileges. Alternatively, in FIG. 3, authorization module 316 of controller 302 can similarly determine whether to grant privileges and output the privileges, if any, that are to be granted to the candidate.

In step 416, the session key is discarded. For example, in FIG. 2, encryption module 214 may discard the generated session key once the identification session is complete. Alternatively, in FIG. 3, encryption module 308 may discard the session key used to encrypt the identification and/or authorization information that is to be output.

The present invention (i.e., elements of FIGS. 2 and 3 and flowchart 400 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 5:
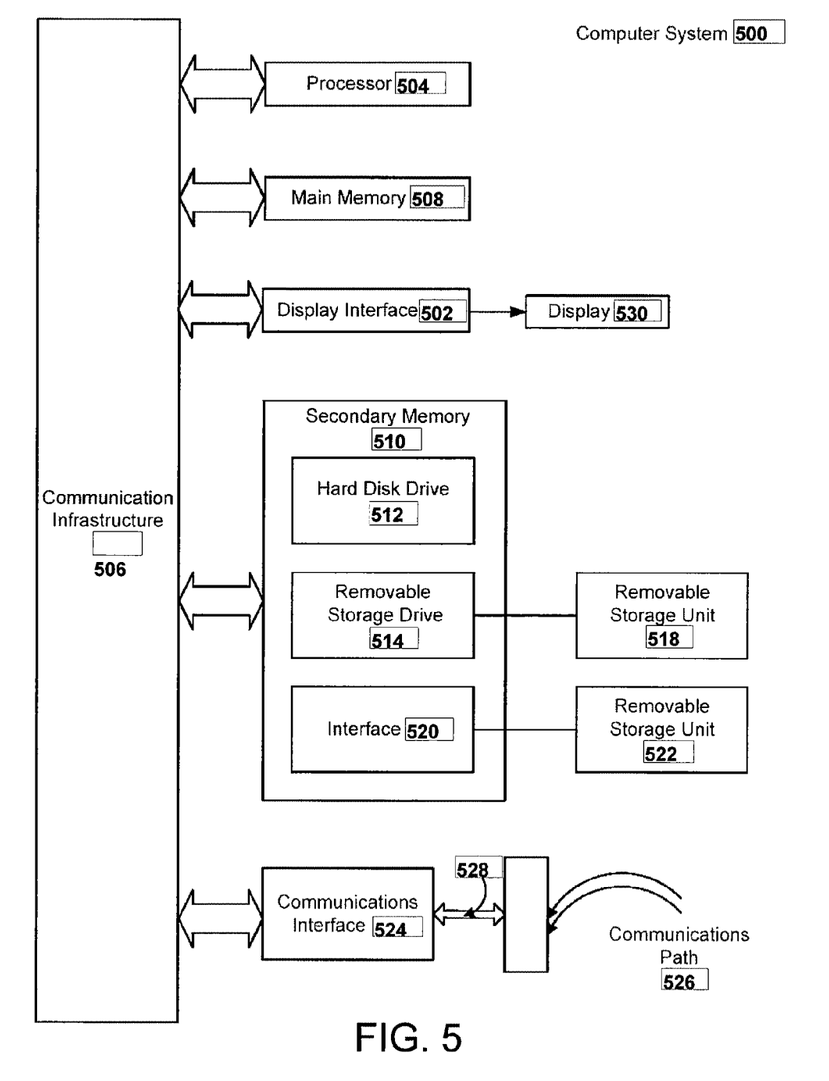
FIG. 5 is a block diagram illustration of an exemplary computer system on which the present invention can be implemented.

In fact, in one embodiment, the invention is directed toward one or more computer systems capable of carrying out the functionality described herein. An example of a computer system 500 is shown in FIG. 5.

The computer system 500 includes one or more processors, such as processor 504. The processor 504 is connected to a communication infrastructure 506 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 514 and a hard disk installed in hard disk drive 512. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A sensor data acquisition module for use in a system for identifying a person, comprising:
    a sensor for obtaining information representing an identification characteristic of a person, and wherein said identification characteristic includes a fingerprint;
    a first memory;
    a key module comprising a one-time programmable (OTP) memory, being a second memory, for storing information representing a key, and wherein said key has a value that is cryptographically random; and
    an encryption module configured for employing said key for encrypting said information representing said identification characteristic of a person prior to storing said information into said first memory; and
    wherein said storing of said key is preserved by circuitry including a first plurality of fuses, and wherein at least a subset of said first plurality of fuses, being a second plurality of fuses, are at least partially blown during manufacture of said key module; and
    wherein each of said second plurality of fuses retains an amount of charge to maintain integrity of said information storing said key prior to a package containing the second memory being breached after manufacture, and wherein upon said package being breached after manufacture, said information storing said key is at least partially destroyed.

2. The sensor data acquisition module of claim 1 wherein the second memory is shielded from electromagnetic scanning.

3. The sensor data acquisition module of claim 1 wherein said key is not recorded during manufacture of the data acquisition unit.

4. The sensor data acquisition module of claim 1, wherein the encryption module is configured to generate a session key from a host key stored in the second memory in accordance with a Diffie-Helman of a Secure hash algorithm.

5. The sensor data acquisition module of claim 1 wherein information representing an identification characteristic of a known person is stored into said first memory.

6. The sensor data acquisition module of claim 5 including a comparison module to compare information representing an identification characteristic of an unknown person with that of said known person.

7. The sensor data acquisition module of claim 1 including an authorization module configured to determine privileges to be granted to a person based upon a determined identity of said person.

8. An identification and authorizing system, comprising:
    a sensor for obtaining information representing an identification characteristic of a person, and wherein said identification characteristic includes a fingerprint;
    a first memory;
    a key module comprising a one-time programmable (OTP) memory, being a second memory, for storing information representing a key, and wherein said key has a value that is cryptographically random; and
    an encryption module configured for employing said key for encrypting said information representing said identification characteristic of a person prior to storing said information into said first memory; and
    wherein said storing of said key is preserved by circuitry including a first plurality of fuses, and wherein at least a subset of said first plurality of fuses, being a second plurality of fuses, are at least partially blown during manufacture of said key module; and
    wherein each of said second plurality of fuses retains an amount of charge to maintain integrity of said information storing said key prior to a package containing the second memory being breached after manufacture, and wherein upon said package being breached after manufacture, said information storing said key is at least partially destroyed.

9. The system of claim 8 wherein the second memory is shielded from electromagnetic scanning.

10. The system of claim 8 wherein said key is not recorded during manufacture of the data acquisition unit.

11. The system of claim 8 wherein the encryption module is configured to generate a session key from a host key stored in the second memory in accordance with a Diffie-Helman of a Secure hash algorithm.

12. The system of claim 8 wherein information representing an identification characteristic of a known person is stored into said first memory.

13. The system of claim 8 including an authorization module configured to determine privileges to be granted to a person based upon a determined identity of said person.

14. The system of claim 12 including a comparison module to compare information representing an identification characteristic of an unknown person with that of said known person.

15. A method for processing sensor data for identifying a person, comprising the steps of:
   providing a sensor for obtaining information representing an identification characteristic of a person, and wherein said identification characteristic includes a fingerprint;
   providing a first memory;
   providing a key module comprising a one-time programmable (OTP) memory, being a second memory, for storing information representing a key, and wherein said key has a value that is cryptographically random; and
   providing an encryption module configured for employing said key for encrypting said information representing said identification characteristic of a person prior to storing said information into said first memory; and
   wherein said storing of said key is preserved by circuitry including a first plurality of fuses, and wherein at least a subset of said first plurality of fuses, being a second plurality of fuses, are at least partially blown during manufacture of said key module; and
   wherein each of said second plurality of fuses retains an amount of charge to maintain integrity of said information storing said key prior to a package containing the second memory being breached after manufacture, and wherein upon said package being breached after manufacture, said information storing said key is at least partially destroyed.

16. The method of claim 15 wherein the second memory is shielded from electromagnetic scanning.

17. The method of claim 15 wherein the encryption module is configured to generate a session key from a host key stored in the second memory in accordance with a Diffie-Helman of a Secure hash algorithm.

18. The method of claim 15 wherein information representing an identification characteristic of a known person is stored into said first memory.

19. The method of claim 15 including an authorization module configured to determine privileges to be granted to a person based upon a determined identity of said person.

20. The method of claim 18 including a comparison module to compare information representing an identification characteristic of an unknown person with that of said known person.

* * * * *